Feb. 6, 1968    D. W. McCORMICK    3,367,172
AIR GAGE HEADS FOR INTERNAL MEASURING OF WAVE GUIDE BENDS
Filed Jan. 11, 1966

INVENTOR
DAVID W. McCORMICK

BY *Melvin L. Crane* AGENT

*R. S. Sciascia* ATTORNEY

United States Patent Office 3,367,172
Patented Feb. 6, 1968

3,367,172
AIR GAGE HEADS FOR INTERNAL MEASURING OF WAVE GUIDE BENDS
David W. McCormick, Vernon, Conn., assignor to the United States of America as represented by the Secretary of the Navy
Filed Jan. 11, 1966, Ser. No. 520,307
4 Claims. (Cl. 73—37.9)

ABSTRACT OF THE DISCLOSURE

The disclosed invention is directed to a device for measuring the inside of a rectangular structure. The device is formed as an elongated cylinder or a flat cylindrical element through which air flow is directed under controlled conditions. The air outlets in the device are adjacent the wall surface to be measured and as the device is moved through the inside of a rectangular member the air flows according to the spacing between the device and the walls. This air flow is recorded and represents the dimensions of the rectangular element.

---

This invention relates to a measuring and testing apparatus and more particularly to a measuring apparatus operating on the principle of leakage of air for determining the height and width of the inside of a rectangular tube such as a wave guide around bends in either direction as well as along a straight section.

There have been in use for some time air gages which operate on the principle of air leakage from a testing or checking nozzle which is placed in juxtaposition to the piece to be tested. The amount of air which leaks or is emitted from openings in the nozzle and through the spacing remaining between the piece to be checked and the nozzle, is a measure of the dimension. Measuring apparatus formed in accordance with the above teaching has been used to measure the outside diameters or dimensions of various types of elements as well as inside dimensions of straight elements. In forming wave guides as well as any other similar tubular or rectangular formed passages, there is a need to measure the inside diameter by a device which is capable of going around bends as well as along the straight portion of the device. Heretofore, air gages made in accordance with the prior art have been such that they are not capable of measuring inside diameters, widths, or heights around a bend such as a 90° bend which in a wave guide may be either the H or the E plane.

The present invention is directed to a device which will measure the inside dimensions of a rectangular wave guide, including a wave guide which has a bend in either the H or the E plane. The device is made such that the device is guided along the inside dimensions so that either the width or the height is measured.

It is therefore an object of the present invention to provide a device which is capable of measuring the inside dimensions of a rectangular tube such as a wave guide.

Another object is to provide a simple, relatively inexpensive, easily manufactured element for carrying out the invention.

Still another object is to provide a device which has the physical geometry capable of passing around a bend in a rectangular tube.

Other objects and advantages of the invention will hereinafter become more fully apparent from the following description of the annexed drawing, wherein.

Figure 1:
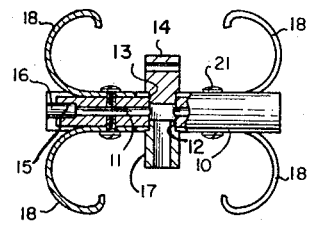
FIG. 1 illustrates one embodiment of the invention which is shown partially in cross section to illustrate the various features thereof.

Now, referring to the drawings, there is illustrated in FIG. 1 one embodiment of the invention which includes a cylindrical main body portion 10. The main body portion has an axial or longitudinal passage 11 drilled through the main body and a radial or transverse passage 12 in the center thereof drilled to meet the axial passage. Opposite the radial passage 12 in axial alignment therewith, there is a screw threaded aperture 13 into which is secured a threaded bolt 14 used for the purpose of pulling the measuring device through the rectangular tube. Each end of the cylindrical body has a recess cut into the end and the main body portion has an enlarged drilled out portion 15 into which a short tube 16 is secured by a tight fit wherein the short tube has a passage therethrough of a specific diameter. The sleeve member extends outwardly to the end of the cylindrical body and is for the purpose of permitting a desired amount of air to pass through the passage in the center thereof wherein the air can escape between the wall being measured and the recessed end. A fitting 17 is secured within the radial aperture drilled into the main body for the purpose of securing an air hose to the device. A pair of spring members 18 is secured to each end of the main body in a recess in the sides thereof, one on each side thereof in the same plane with the axis of the aperture drilled into the center portion of the main body. The springs extend outwardly from the end a small distance and are secured to the body by suitable screws 21 or any other method. The spring members act as guides as the air gage head is passed through a wave guide or any other such rectangular member for determining the inner width of the wave guide. The main body may be made of any diameter, depending on the dimensions of the tube to be measured, just so long as the device will fit within the element which is to be measured. The diameter is such that in cooperation with the springs the device will pass around a 90° bend in the H plane to determine the width of the wave guide. The bolt screwed into the main body opposite from the air inlet is provided with a hole therethrough or any other suitable connection such that it can be used to pull the air gage head through the element that is to be measured.

In using the above described device to measure the width of a rectangular tube, the cylindrical member is made approximately the same width as the rectangular tube to be measured and of a less diameter than the height of the rectangular tube. The short tube air passage 16 in the end of the cylindrical member extends outwardly to a close distance from the walls being measured. The spring members maintain the measuring device centered such that equal mounts of air will expire from each end of the air gage head as the device is drawn through the tube being measured. When the width is less than desired, less air will flow and will be indicated by any suitable air gage to which the air gage head is connected. When the width is greater than desired, more air will flow and will be indicated by the air gage. The air flow measuring device may be connected to an electrical or mechanical recorder to trace a plot of the air flow on a chart which will be representative of the width of the rectangular tube as the air gage head is pulled through the tube.

Figure 3:
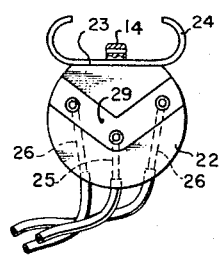
FIG. 3 is another embodiment shown partially in cross section to illustrate the various features therein.
Figure 4:
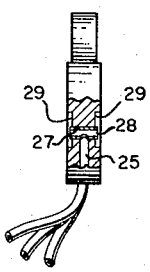
FIG. 4 is a side view of the embodiment illustrated in FIG. 3 to more clearly illustrate various parts thereof.

FIG. 3 is another embodiment of the invention which is formed as a cylinder 22 of very short height. The cylinder is cut along a cord 23 of an end circle to form a flat portion to which a spring 24 having a diameter across the spring which is slightly greater than the diameter of the cylinder is connected.

Figure 2:
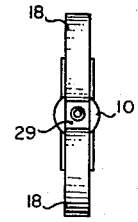
FIG. 2 is an end view of the device of FIG. 1.

An aperture 25 is drilled into the cylinder on a radius perpendicular to the cord cut from one side thereof and drilled from the side opposite from the cord. The aperture is drilled into the cylinder slightly less than half the distance between the end surface and cord. Two other transverse apertures 26 are drilled into the cylinder on opposite sides from aperture 25 such that they extend into the cylinder a distance such that they will not pass entirely through the cylinder. Three holes 27 are drilled longitudinally through the cylinder such that they pass one through each of the apertures drilled into the cylinder from a side thereof. Thus, three air passages are extended from the bottom and top of the body portion and joined at their centers with the transverse and radial passages to form air passages. Each end of the cylinder is provided with a recess 29 in the surface thereof along the holes 27 such that the surface of the device in the vicinity of the longitudinal holes is lower than the main end surface. The other embodiments are provided with similar recesses to permit passage of air between the inner surface of the device being measured and the end of the air gage head. Cylindrical sleeves 28 having passages of a desired opening are extended into the body portion from the upper and lower surface thereof into the holes drilled into the body and extend outward from the recess to a level with the main surface. Thus air passing through the apertures drilled from the side thereof will pass through the transverse apertures and out through the sleeves of the upper and lower surface of the body. The spring member may be mounted onto the body by any suitable means such as solder or bolts wherein a center bolt or other means in axial alignment with the center aperture can be used to pull the air gage head through the wave guide or other similar element which is to have the height of the passage measured. Since the device is circular in form, it will pass through a rectangular tube, wave guide or other rectangular element in which there are 90° bends in the H plane. The embodiment shown in FIG. 2 may be referred to as an air gage head for a wave guide ½WR102 universal radius H-plane height gage.

Figure 5:
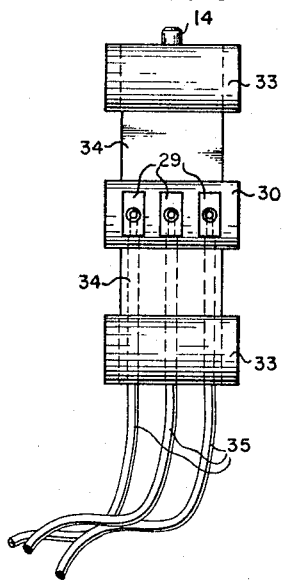
FIG. 5 is another embodiment thereof shown partially in cross section to illustrate various features thereof.
Figure 6:
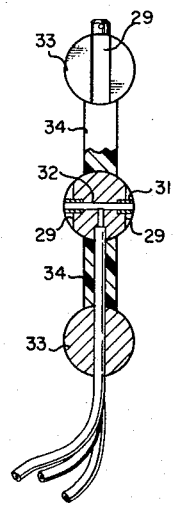
FIG. 6 is a side view of the embodiment shown in FIG. 5 which illustrates various features thereof.

FIG. 5 is another embodiment 30 of an air gage head which may be used for measuring H-plane height, or by modification of the device it may be used to measure the H-plane width. As shown, the gage head is similar to the body member as described in FIG. 1. However, the air passages 31 are such that the holes 32 are drilled from the side of the body rather than longitudinal as shown in FIG. 1. In this manner, air passes through the body and escapes through the side surfaces rather than the end as shown in the device in FIG. 1. In order to guide the wave gage head through a wave guide curvature in the H plane, a solid cylindrical member 33 is secured before and aft of the wave gage head with a connection in between of pliable material 34 such as a plastic or rubber material. Thus, in use, when the device is passed through a wave guide, the forward and back solid cylindrical members will act as guides in the front and aft of the wave gage head and the pliable material in between the forward and aft cylindrical members and the wave gage will permit the device to go around the bend in the wave guide. However, only one guide member must be used. As shown, a separate air line 35 is connected with the three separate air passages such that each of the air passages may be used to measure a definite wall height through the wave guide. The three air passages work independently of each other. Therefore, three separate air gage air supply mechanisms would be used in carrying out the measurement.

The device as shown in FIG. 5 may be used to measure the width of a wave guide in the H plane by making the air passage through the device the same as that shown in FIG. 1. Thus, the device will be guided through the wave guide around bends by the pliable material between the solid cylindrical members and the wave gage head. The air passing through the wave gage head will pass from the body at the ends thereof rather than on the sides as shown in the modification FIG. 5. In the case where the device is used to measure the width of the wave guide, there would be only one air inlet to the wave gage head where the air would be divided at the center of the wave gage head and will expire from each end thereof according to the distance between the wave gage head and the wall. The device as shown in FIG. 1 could be made similar to that shown in FIG. 3 such that the air would escape from the side of the housing rather than the ends. Thus three separate air inlet lines would be used to feed the air to the wave gage head. The spring would be used to guide the device through the wave guide as described above for the embodiment of FIG. 1.

In operation of the air gage heads herein described, the air gage heads are connected with any commercial air gage air supply system suitable for measuring the air flow through the gage. Such air supply gages are well known in the art. The air nozzles in the air gage heads limit the amount of air flow through the nozzle wherein the spacing between the air outlet of the air gage head and the wall being measured will permit air flow through the gage which is uniform with surfaces of correct height. If the spacing between the wall surface being measured and the air gage head is greater than desired, then more air will flow through the air gage head. If the spacing between the air nozzle of the air gage head and the wall surface is less than normal, then the air flow will be impeded which will be indicated on the standard air flow age. Thus a determination of the width or height of the wave guide being measured can be determined by the amount of air flow through the air gage head. Such measurements may be read out electrically or mechanically on a graph such that a tracing representative of the width or height of the wave guide may be determined as the air gage head is pulled through the wave guide. Thus, the wave gage head is pulled at a constant rate through the wave guide such that the indicator will determine the recording as desired.

The different embodiments of the present invention operate like any standard type plug air gage. However, their special shape and geometry allow the wave gage head of the present invention to pass around corners inside rectangular wave guides and stay in a correct position to allow the air gage to operate. These air gage heads may be used in a gage room where the air supply in any standard gage is available. A different set of gages is required for each different size wave guide or other rectangular shaped tubes or passages.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. An air gage head for measuring the inside dimensions of a rectangular tube, around bends as well as along a straight section, which comprises:
   a cylindrical body,
   a longitudinal passage through said body,
   a transverse air passage within said body that meets with said longitudinal passage through said body,
   an air outlet means in each of said cylindrical body formed within said longitudinal passage within said body,
   means for connecting said transverse air passage with an air supply from an air flow indicator means separated from said air gage head to supply an air flow for said air gage head, and guide means for guiding said air gage head through a rectangular tube.

2. An air gage head as claimed in claim 1, wherein said guide means is formed by springs connected with said body and adapted to contact the walls of the rectangular tube.

3. An air gage head as claimed in claim 2 wherein said guide means is formed of at least one cylindrical element with a pliable material secured between said body and said guide means.

4. An air gage head as claimed in claim 10, wherein:
said cylindrical body is recessed at each end about each of said air outlet means and
each of said air outlet means extends outwardly from said recessed portion to within the outer end surface of said cylindrical body.

References Cited
UNITED STATES PATENTS

| | | | |
|---|---|---|---|
| 2,623,294 | 12/1952 | Fox | 73—37.9 |
| 2,637,200 | 5/1953 | Adkins | 73—37.9 |
| 2,779,188 | 1/1957 | Meyers. | |

LOUIS R. PRINCE, *Primary Examiner.*

W. HENRY, *Assistant Examiner.*